United States Patent [19]

Gurny

[11] E Patent Number: Re. 33,774

[45] Reissued Date of Patent: Dec. 24, 1991

[54] COORDINATE MEASURING AND TESTING MACHINE

[75] Inventor: Werner H. Gurny, Wadgassen, Fed. Rep. of Germany

[73] Assignee: Wegu-Messtechnik GmbH, Wadgassen, Fed. Rep. of Germany

[21] Appl. No.: 554,457

[22] Filed: Jul. 19, 1990

Related U.S. Patent Documents

Reissue of:

[64] Patent No.: 4,908,951
Issued: Mar. 20, 1990
Appl. No.: 317,617
Filed: Mar. 1, 1989

[30] Foreign Application Priority Data

Mar. 2, 1988 [DE] Fed. Rep. of Germany ..... 3806686

[51] Int. Cl.[5] ..... G01B 7/03; G01B 7/28; G01B 11/03; G01B 11/24

[52] U.S. Cl. ..... 33/503; 364/560; 358/96; 358/107; 356/376; 33/504; 33/505; 33/1 M

[58] Field of Search ..... 33/503, 504, 505, 1 M; 364/560, 561, 562; 358/96, 107; 356/376, 394

[56] References Cited

U.S. PATENT DOCUMENTS

| | | | |
|---|---|---|---|
| 3,728,481 | 4/1973 | Froehlich et al. | 358/96 |
| 3,750,295 | 8/1973 | Nordmann et al. | 33/503 |
| 4,240,745 | 12/1980 | Green | 358/107 |
| 4,271,477 | 6/1981 | Williams | 364/563 |
| 4,493,968 | 1/1985 | Brown | 356/376 |
| 4,541,722 | 9/1985 | Jenks | 356/376 |
| 4,575,805 | 3/1986 | Moermann et al. | 356/376 |
| 4,634,879 | 1/1987 | Penney | 356/376 |
| 4,653,011 | 3/1987 | Iwano | 33/504 |
| 4,677,755 | 7/1987 | Iwano et al. | 33/503 |
| 4,692,690 | 9/1987 | Hara et al. | 356/394 |
| 4,695,982 | 9/1987 | Preysman | 33/504 |
| 4,721,388 | 1/1988 | Takagi et al. | 356/376 |
| 4,732,483 | 3/1988 | Biegen | 356/359 |
| 4,810,095 | 3/1989 | Kawauchi et al. | 356/394 |
| 4,818,110 | 4/1989 | Davidson | 356/359 |
| 4,848,912 | 7/1989 | Sano et al. | 356/394 |
| 4,906,099 | 3/1990 | Casasent | 356/394 |
| 4,910,690 | 3/1990 | Fujita | 356/394 |
| 4,957,367 | 9/1990 | Dulman | 356/394 |

FOREIGN PATENT DOCUMENTS

| | | |
|---|---|---|
| 0206744 | 12/1986 | European Pat. Off. . |
| 3616812 | 11/1987 | Fed. Rep. of Germany . |
| 3725347 | 2/1988 | Fed. Rep. of Germany . |
| 60-224009 | 7/1985 | Japan . |
| 61-2008 | 2/1986 | Japan . |
| 61-31909 | 4/1986 | Japan . |
| 62-245109 | 5/1987 | Japan . |
| 1277014 | 6/1972 | United Kingdom . |
| 2190487 | 11/1987 | United Kingdom . |

OTHER PUBLICATIONS

Technical Journal, Industrieanzeiger, H.103/104, 1987, p. 56.

Technical Journal, Industrieanzeiger, No. 56, 1984, pp. 113–119, Kap. 2.2, FIG. 3, 8.

Technical Journal, Sensor Review, Oct. 1987, p. 174.

Technical Journal, Technisches Messen tm, 53, 1986, pp. 286–292.

Technical Journal, Technische Rundschau, 40, 1985, pp. 28–37.

*Primary Examiner*—William A. Cuchlinski, Jr.
*Assistant Examiner*—Diego F. F. Gutierrez
*Attorney, Agent, or Firm*—Wood, Herron & Evans

[57] ABSTRACT

Multi-coordinate measuring and testing machine which is essentially constituted from a fundamental machine unit, a scanning or sensing system which is movable in at least two coordinate directions, and a machine-controlling unit. The scanning or sensing system is constructed as a multi-sensor system and is constituted from a mechanical sensing head or probe with at least one stylus and/or a video scanner and/or a laser scanner which are controlled from a microprocessor and operate independently of each other, and which are selectively either individually actuatable by means of software connected thereto, or can be coupled to each other in a dual or triple combination.

32 Claims, 3 Drawing Sheets

COORDINATE MEASURING AND TESTING MACHINE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a multi-coordinate measuring and testing machine which is essentially constituted from a fundamental machine unit, a scanning or sensing system which is movable in at least two coordinate directions, and a machine-controlling unit.

Multi-coordinate measuring and testing machines of that type are counted as being within the general state of technology, and in practical applications, have been introduced a multiplicity of constructions.

2. Discussion of the Prior Art

Current measuring machines, as a rule, are constructed in portal or a gantry-type constructional mode, and are equipped with a mechanical probe or sensor head possessing measuring sensors. Other known measuring and testing machines concern themselves with non-contacting measurement; for example, through the intermediary of interferometer systems. Considered by themselves, both methods of measurement are subject to a series of advantages and also disadvantages.

Thus, for example, known from the disclosure of German Laid-open Patent Application 36 16 812 is a coordinate measuring device with an arrangement for the non-contacting scanning or sensing of the measured object. Through the intermediary of an interferometric linear measurement system, the path of displacement of a measuring mirror for each measuring coordinate, which is fixedly interconnected with the coordinate table. Hereby, the reference mirror of the interferometric linear measurement system is rigidly connected with the scanning system for the measured object such that, with relatively minor technological expenditures, there can also be determined even extremely minute displacements of the imaging objective in comparison with the measured coordinate direction and enabling the preclusion of any influences caused by tilting errors.

The specification of German OS No. 36 16 345 discloses an interferometer system for linear and angular measurement, which is constituted from a total of two interferometer systems, so as to be able to simultaneously implement, at a high degree of precision, linear and angular measurements as well as measurements of refractive index.

The principle of the interferometric linear measurement is already known since the year 1890 from the Michelson Interferometer. However, it is also known that a laser interferometer which is utilized as a linear measurement system, necessitates a not inconsiderable additional expenditures in contrast with.other; for instance, mechanical sensor or scanning heads. Through the use of laser interferometer systems there can be achieved a resolution or definition of up to 0.01 μm. However, the length of the laser lightwave is dependent upon the temperature, the pressure and the humidity in the region which is traversed by the measuring beam. Any fluctuation in these environmental conditions will act without inertia or delay on the results of measurement. This signifies that, on the one hand, laser interferometer-linear measurement systems afford an extremely good capability for a precise non-contacting measurement; however, on the other hand, under unfavorable environmental conditions, are capable of delivering erroneous measurement results.

In addition to the above-mentioned non-contacting measuring systems, mechanical sensing or scanning systems are considered to be within the known general state of the technology. These mechanical sensing systems for multi-coordinate measuring machines consist essentially of a spindle on which there is mounted a probe or sensor head, having styli; provided thereon, and sensor balls or spheroids on tips of the styli. The mechanical sensing systems are relatively robust and possess an adequate degree of precision in their measurement. The deflection of the stylus can be either translatory or rotational and, upon contacting the workpiece, generates control signals for the drives. These signals facilitate the provision of constant-remaining, reproduceable or repeatable contacting conditions. In the known sensing systems, a further distinction is made between the measuring and switching systems.

In the measuring sensing systems, in the position of measurement the deflection of the probe stylus is determined through systems for measuring small displacements; whereas in the switching sensor systems, upon reaching of the defined contacting position or a define sensor deflection, a switching signal is generated in the stylus.

Heretofore, prior to the purchase and installation of a coordinate measuring and testing installation, an expert in this technology always needed to extremely carefully investigate the conditions in the utilization and measuring tasks prior to deciding on one or the other installation; namely, either the non-contacting or mechanical sensing system. The provision of both variants of the installations was frequently prohibitive due to space limitations, and integrating as well as cost reasons.

SUMMARY OF THE INVENTION

Accordingly, it is an object of the present invention to develop a multi-coordinate measuring and testing installation which, independently of environmental conditions, is employable for measuring and testing or inspecting tasks which are encounted in actual practice, and which is simply implementable and at a relatively low technological expenditure.

Inventively, the foregoing object is attained pursuant to the invention, in that the scanning or sensing system is constructed as a multi-sensor system and is constituted from a mechanical sensing head or probe with at least one stylus and/or a video scanner and/or a laser scanner which are controlled from a microprocessor and operate independently of each other, and which are selectively either individually actuatable by means of software connected thereto, or can be coupled to each other in a dual or triple combination. Hereby, in a preferred embodiment of the invention, for the control or actuation of the entire multi-sensor scanning or sensing system, there need be installed only a single software and the laser scanner and video scanner may be located along the same beam path.

Through this arrangement, within a single unit the measuring and testing installation avails itself of all known advantages of the individual scanning or sensing systems. By means of this multi-coordinate measuring and testing center, in an optimum manner it is possible to solve all encountered measuring tasks and under all environmental conditions. The measuring and testing center can be assembled as a single unit. Just as well, it can also be integrated into transfer machine installations or processing or work treatment centers, and as a result thereof introduceable into the work flow or production line. The coordinate measuring and testing installation, pursuant to the features of the invention, unites the non-contactingly operating video scanner, the laser-scan system and the contacting measuring probe. Thus, there can be non-contactingly automatically measured suitable surface contours, as well as expedited pure measuring tasks, whereby the entire installation optimally fulfills these tasks without the need for any refitting. The inserted software coordinates the communication with the video-processor system and the CNC movement control over the installation. In accordance with the inventive concept, the inserted different scanning systems can carry out independently of each other and alternatively the required measuring and testing tasks. Just as well, they can also be coupled to each other in a dual or triple combination, and fulfill measuring and testing tasks in parallel with each other, and finally can be so controlled or actuated that the required measuring and testing tasks can be implemented by means of the scanning systems in succession and in interchangeably different dual and triple combinations.

Pursuant to a particular feature of the invention, there can be provided two spindles which are movable in the Z-coordinate direction, of which one spindle supports the mechanical probe with styli, and the other spindle the video scanner and laser scanner. In this case, the spindles can be arranged on a common measuring carriage.

In accordance with a further feature of the invention, there can be provided a separate measuring carriage can be movable in synchronism as well as also separately of each other in, selectively, the same or different coordinate directions.

The least technological expenditure is encountered when the spindles which are inserted in the Z-direction, together with the respective scanning systems, are mounted on a common carriage or other kind of support. Thereby, it is ensured that for certain measuring and testing tasks there is obtained, for instance, a reduction with respect to the measuring period. Through the receipt of the two spindles on separate measuring supports, there are achieved a series of advantages. The measuring carriages, within the contexts of the invention, can be movable in synchronism in either the same or different coordinate directions. They can just as well be displaced at different times in the same or different coordinate directions. The large number of possibilities which are connected with this type of the spindle mounting affords a measurement and testing under varying conditions and the solution of even complicated measuring tasks within a short period of time. Through the combination of the scanning systems in a single machine installation, there can be further tested the measured results of the one system by means of the other system.

Pursuant to a further aspect of the invention, the laser scanner can be utilized in a scanning operation as well as autofocus.

According to a further feature of the invention, the laser scanner, during scanning operation, continually regulates the movement of the Z-axis in correlation with the surface contour whereby, advantageously, the scanning direction is expediently predeterminable in the X and Y-axis. In order to be able to continually regulate the contour-detecting measuring axis in real-time within the effective laser range, and to afford high scanning speeds at a concurrently high degree of precision in measurement of about 0.5 μm, and an adjustable measurement definition of 0.1 μm to 10 μm, the laser scanner can during scanning operation can follow non-contactingly at a constant distance the surface contour of a workpiece in the X and Y-coordinate directions, whereby the laser scanning system is formed from two interlinked closed control circuits, of which the first control circuit correlates the transmitting power of the laser with the reflective characteristic of the workpiece, and in dependence upon the receiving signal in the receiver controls the transmitting signal in the transmitter, whereas the second superposed control circuit controls the continual follow-up of the carriage or; in essence, the spindle in the Z-direction into the optimum housing plane.

Hereby, in an advantageous embodiment, the receiver system can be equipped with differentiating diodes, through which there is generated a differential signal in conformance with the focused position of the objective, which by means of an axial amplifier and a servomotor automatically positions the Z-axis in the focusing plane. The measuring carriages, or in essence, the spindle with the laser scanner, can posses a measuring system with a glass measuring rod of the Z-axis and to convey the current position of height along the Z-axis to the main computer.

Pursuant to a still further embodiment, the video scanner can pick up measuring points along the outer contour of the workpiece, which are determined from a digitalized picture produced by a video processor for the applicable workpiece segment. The contours of the workpiece in the X- and Y-coordinates can hereby be determinable through edge tracing routines in the digitalized picture, and the measuring points in the Z-direction can be formed with a focusing apparatus and the camera picture or through a high-precision laser-focusing system. During the edge tracing routine individual measuring points are interlinked with each other into a measuring program. The digitalized picture can be a gray picture as well as a binary picture.

Finally, the mechanical probe can, selectively, be a switching or a measuring probe, and the fundamental machine unit can be constructed in a portal or gantry-like structure with a solid base, which for the receipt of the workpieces selectively includes a turntable, and on a traverse receives the measuring carriage or carriages for the spindles longitudinally displaceably in a direction of travel which is at right angles to or extends in the same direction as the gantry, whereby in the measuring carriage or carriages and the spindles are controllable from a control panel, and the obtained results of measurement on the picture screen of a display unit and/or by means of a printer.

BRIEF DESCRIPTION OF THE DRAWINGS

Reference may now be had to the following detailed description of exemplary embodiments of the invention, taken in conjunction with the accompanying drawings; which.

DETAILED DESCRIPTION

Figure 1:
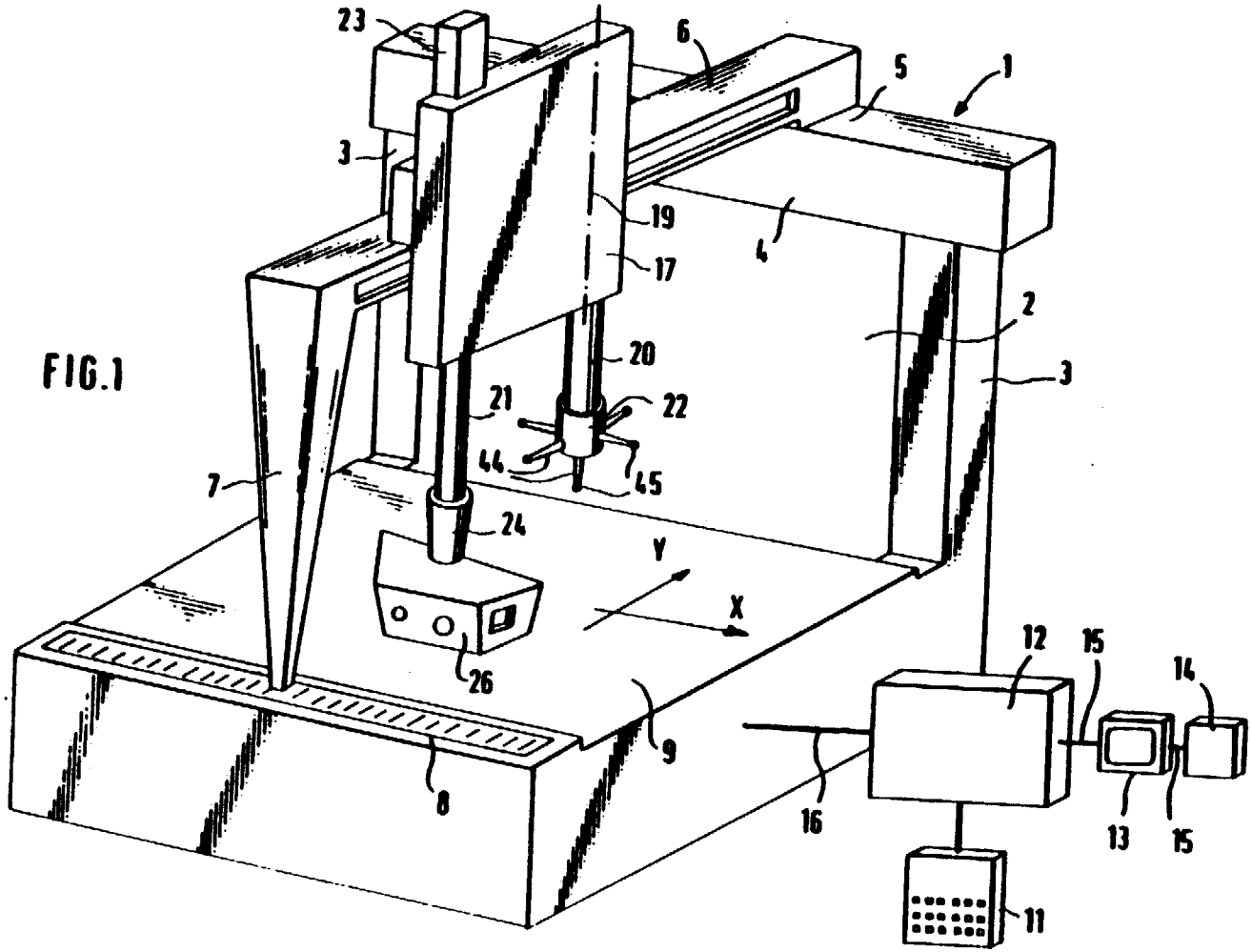
FIG. 1 illustrates in a simplified perspective representation a three-coordinate measuring installation pursuant to the present invention.
Figure 2:
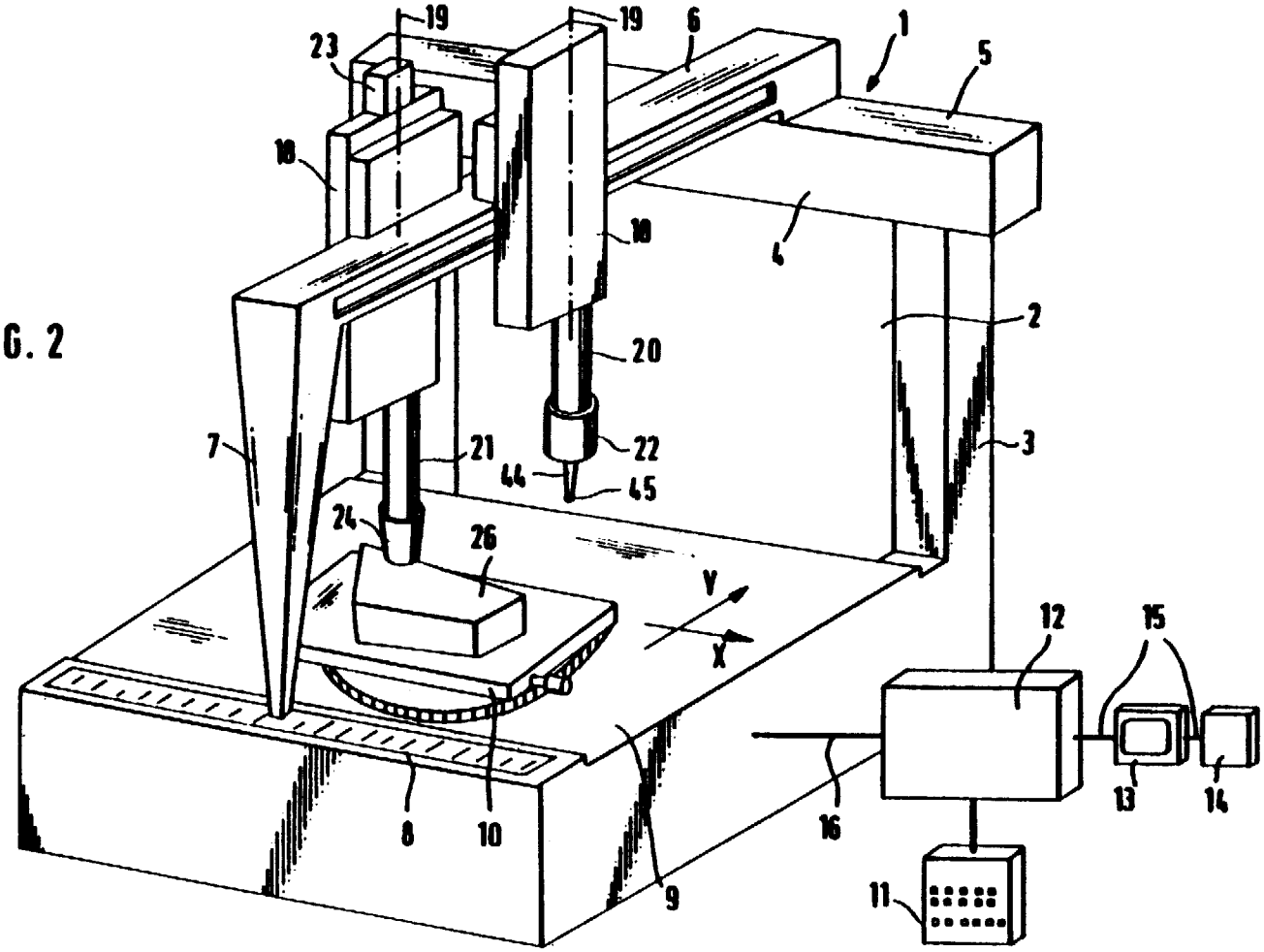
FIG. 2 illustrates a simplified perspective representation of a three-coordinate measuring installation with two measuring carriages for the Z-spindles.

The three-coordinate measuring installation 1 pursuant to FIGS. 1 and 2 is a measuring machine, or fundamental machine unit, which is constructed in the mode of a portal or gantry-like structure with a stationary portal 2 which is formed from the two side pillars or supports 3 and the traverse 4. The traverse 4 concurrently represents the guide track 5 for the cross-carrier 6, the latter of which supports itself through a support 7 on the second guide track 8. The cross-carrier 6 is displaceable above a measuring table 9 along the two guide tracks 5 and 8 which are arranged in parallel with each other, until it contacts end stops, which table is installed between the portal 2 and the guide track 8. The measuring table 9, pursuant to FIG. 2, is constructed as a measuring turntable 10.

Reference numeral 11 represents an input or programming panel, *or machine control unit,* or a function panel, through the intermediary of which there can be called up the individual functions of the measuring installation 1. In order to convert the commands into corresponding functions, a computer, *or microprocessor,* 12 is arranged between the input panel 11 and the measuring installation 1. The results of measurement are displayable or recordable on a picture screen 13 and/or a printer 14. For this purpose, the picture screen 13 of a display unit and similarly the printer 14 are connected with the central computer 12 through the electrical lines 15. The line 16 from the computer 12 is connected with drive elements; for instance, drive motors for the movement of travel of the cross-carrier 6 and carriages 17 and 18, and with electronic devices of the scanning system.

The schematic and simplified representation of the three coordinate measuring machine or installation is only one of possible types of construction. Instead of the illustrated embodiment, there can naturally be expediently employed other known types of constructions, without deviating from the scope of the invention and the field of application.

A carriage 17 is arranged on a cross carrier 6, and which is movable thereon offset by 90° relative to the direction of travel of the cross-carrier 6. The measuring carriage 17 receives two spindles 20 and 21 which are displaceable in the Z-direction 19.

In accordance with FIG. 2, two measuring carriages 18 are arranged on the cross-carrier 6 so as to be displaceable along the cross-carrier 6. Both measuring carriages 18 each possess, respectively, a spindle 20 and 21 which are movable in the Z-direction 19, and which are actuatable independently of each other. The measuring carriages 18 can be displaceable in synchronism in either the same or opposite directions. They can be alternatively movable and carry out different directions of travel and types of movement.

The spindles or sleeves 20 and 21 are similarly so actuated so as to be movable in synchronism in the same as well as opposite directions, or carry out alternative movements.

In the illustrated exemplary embodiment, the spindle 20 presently mounts the switching sensor head or probe 22, and the spindle 21 mounts the video scanner 23 and the laser scanner 24. Naturally, the reverse arrangement is also possible with this construction.

For the determination of the contour of the workpiece surfaces 25, the three-coordinate measuring installation 1 is equipped with a laser scanner 24, on the spindle 21, through which there are automatically measured non-contactingly suitable surface contours. In contrast with lasers which operate pursuant to the triangulation method, the laser scanner employed therein follows the surface contour at a constant distance therefrom. This method possesses the advantage that the contour-determining measuring axis is continually regulated in real-time within the effective laser range and read-off by the central computer 12. Resulting therefrom is a high scanning speed and a high degree of precision in measurement. The essential technological advantages of the inserted laser scanner 24, which is hereinbelow described in more precise detail, are as follows:

1. Non-contacting determination of measurements which are free of measuring forces.
2. High scanning speed.
3. Adjustable measuring definition of 0.1 μm to 10 μm.
4. High degree of measuring precision of 0.5 μm.

The laser scanner 24 continually regulates the movement along the Z-axis 19 in conformance with the surface contour. The scanning direction along the X-axis and Y-axis by means of the measuring carriages 17 and 18 and the cross-carrier 6 are expediently predeterminable through the input panel 11 with computer 12. Underlying the scanning principle predicated is the so-called light-intersection method, in which the reflecting surface of the workpiece 26 is utilized as a reference for focusing. Serving as a light source 27 is an impulse laser diode 28, whose luminescent surface is imaged by means of an optical system through the optical axis 29 of the presently employed lens system 30 onto the workpiece surface 25. The light beam 31 emanating from the impulse-laser diode 28 strikes against a mirror 32 which is angled at 45°, is deflected from there towards a lens 34 and concurrently again conducted again to a second mirror 33 angled at 45°, and from the latter to the lens 30 over the workpiece surface 25. From there, the light beam 31 is reflected, and by means of the mirrors 33 and 32 retransmitted to the lens 34. Thus, the workpiece 26 remits a portion of the reflected laser light through the lens 30 and optical system 33, 32, 34 onto a receiver system 36 which is equipped with the differentiating diodes 35. On the basis of this type of imaging which is applied in this system, the measuring point wanders out during the defocusing and generates a differential signal in the linear amplifier 37, which positions the Z-axis 19 again in the focusing plane through the intermediary of a servomotor 38. At 39 the measuring point is displaced towards plus by the value of $\Delta F$, whereas at 40 there is effected the displacement towards minus by the value of $\Delta F$. In conformance with the optical system, these measuring points are reflected to the differentiating diodes 35, and transmitted further in the receiver 36 as a signal through the transmitter 28 for correlating of the measuring carriage 18 in the Z-coordinate 19.

Figure 3:
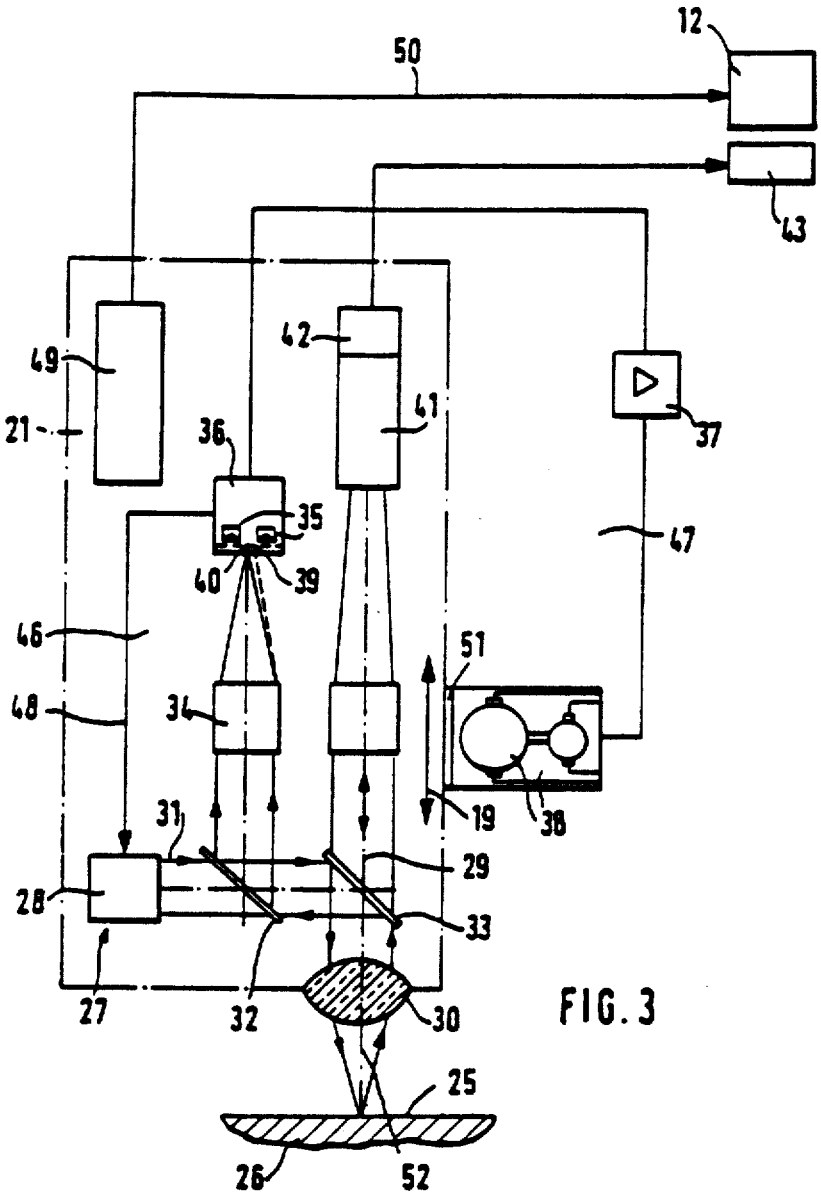
FIG. 3 illustrates a block circuit diagram of a the laser scanning system with an autofocusing system.

As is further ascertainable from FIG. 3, in addition to laser scanner 24, the spindle 21 also possesses the video scanner 23 which is essentially constituted from a camera 41 with a picture-processing device 42. The video scanner 23 operates in a non-contacting mode along the Z-axis 19 through the lens 30 on the workpiece surface 25. The determination of the individual measuring points on a workpiece 26 which is to be considered is effected on the basis of a gray image of the segment o the measured object which is digitalized by a video processor 43. The measuring points are hereby picked up at the outer contour of the workpiece 26. The applicable contours in the X and Y-directions are determined by edge finding or tracing routines in the gray image; whereas in the Z-direction 19, the measuring points are formed with the automatic focusing apparatus and with the assistance of the camera picture, or with a high-precision laser-focusing system.

FIG. 3 illustrates in principle, two interdigitating control circuits 46 and 47. The control circuit 46 through the interconnection 48 controls the control signal in the transmitting system 28 in dependence upon the receiving signal. The control circuit 46 determines the transmitting power of the continuous-wave laser 24 with respect to the current reflective characteristics of the workpiece 26.

The control circuit 47 is superimposed on the control circuit 46 and controls the autofocus through the servomotor 38. Hereby, there is facilitated the continual follow-up of the entire carriage 21 in the Z-direction is facilitated for a constantly optimum focusing plane. The position of the carriage 21 in the Z-direction is maintained through a measuring system 49 with a glass measuring rod, and transmitted to the main computer 12 through an electrical line 50.

The servomotor 38 is drivingly interconnected with the spindle 21 for the movement in the z-coordinate direction, as is indicated by reference numeral 51.

In order to be able to emphasize edges under conditions of poor contrast, there can be employed filters for the gray image. For the description of the nominal geometry of the workpieces there are available the known basic geometric elements, such as point, line, circle, ellipse, plane, cylinder, sphere and cone.

The switching sensor head or probe 22 has a suitable undefined sensing deflection and a switch point for the microswitch in the probe. The scanning is carried out mechanically with the stylus 44 along the surface of the workpiece. Through the scanning contact, there is actuated microswitch in the probe 22 and an impulse is transmitted to the computer 12, which represent a measured result. The stylus 44, in a usual manner supports a sensing ball 45 at its free end.

It is of considerable importance that the laser scanner 24 and the video scanner 23 are located or operate along the Z-axis 19 within the same common beam path 52. Only then is it possible that by means of both systems; in effect, from the video scanner 23 with the video camera 41 and a picture processing installation 42, and from the laser scanner 24 with the impulse-laser diode 28 and the lens 34, as well as the mirrors 32, 33, there is always determined the same measuring point on the workpiece 26.

What is claimed is:

1. Multi-coordinate measuring and testing installation, comprising a fundamental machine unit; a scanning system *mounted upon said fundamental machine unit and* movable in at least two coordinate directions; and a machine control unit *for inputting commands for controlling operation of said scanning system*, said scanning system being a multi-sensor scanning system constituted of a mechanical probe having at least one sensing stylus, a video scanner and a laser scanner; a microprocessor *interconnected with said machine control unit* for controlling said sensing stylus and [scanner] *scanners* so as to be operable independently of each other and being selectively actuatable [along] *alone* through software or coupleable to each other in a dual or triple operative combination, said video scanner and the laser scanner being arranged on a common beam path for detecting the same measuring point on a workpiece.

2. An installation as claimed in claim 1, wherein a single said software is provided for the actuation of the entire multi-sensor scanning system.

3. An installation as claimed in claim 1, comprising two spindles movable in a Z-coordinate direction, one said spindle mounting the mechanical probe having sensing styl; and said other spindle mounting said video scanner and said laser scanner.

4. An installation as claimed in claim 3, wherein said spindles are arranged on a common measuring carriage.

5. [Am] *An* installation as claimed in claim 3, wherein a measuring carriage is provided for each said spindle, said spindles being movable in synchronism and also separately of each other in selectively the same or different coordinate directions.

6. An installation as claimed in claim 4 or 5, wherein said laser scanner is employable in a scanning operation and also in autofocus.

7. An installation as claimed in claim 6, wherein said laser scanner during scanning operation non-contactingly follows the surface contour of a workpiece being measured at a constant distance therefrom along the X and Y-coordinate directions, said laser scanning system comprising [two] *first and second* interlinked closed control circuits, [a] *said* first [said] control circuit determining the transmitting power of the laser relative to the reflective characteristics of the workpiece and in dependence upon a receiving signal in a receiver controlling a transmission signal in a transmitter, and [the] *said* second [said superimposed] control circuit controlling the continual follow-up of the measuring carriage and spindle in the Z-direction into an optimum focusing plane.

8. An installation as claimed in claim 7, wherein said receiver includes differentiating diodes for generating a differential signal in conformance with the focusing setting of a lens, said Z-axis being automatically positioned through a linear amplifier and servomotor into the focusing plane.

9. An installation as claimed in claim 7, wherein said measuring carriage and spindle for the Z-axis includes a measuring system with a glass measuring rod, and the present position of elevation is conveyed to a main computer.

10. An installation as claimed in claim 1, wherein the video scanner receives measuring points along the external contour of the workpiece said measuring points being determined by a digitalized picture of a respective segment of the workpiece which is generated by a video processor, the contours of said workpiece being determinable along the X and Y-coordinates through edge tracing routines in the digitalized picture, and the measuring points in the Z-direction being formed with a focusing means and the camera picture or a high-precision laser focusing system.

11. An installation as claimed in claim 1, wherein said mechanical probe is selectively a switching or a measuring probe.

12. An installation as claimed in claim 4 or 5, wherein the fundamental machine unit comprises a portal-like gantry structure having a solid base, selectively including a measuring turntable for receiving the workpiece, and a cross-carrier supporting the measuring carriage for the spindles for longitudinal displacement thereon in a direction of travel at right angles or equally directed relative to said gantry structure, said measuring carriage or carriages and the spindle or spindles being controllable from a control panel and the obtained results of measurement being recordable on a picture screen of a display unit or selectively on a printer.

*13. Multi-coordinate measuring and testing installation, comprising a fundamental machine unit; a scanning system mounted upon said fundamental machine unit and movable in at least two coordinate directions; and a machine control unit for inputting commands for controlling operation of said scanning system, said scanning system being a multi-sensor scanning system consisting of a mechanical probe having at least one sensing stylus, and a non-contacting scanner selected from the class comprising a video scanner and a laser scanner; a microprocessor interconnected with said machine control unit for controlling said sensing stylus and said non-contacting scanner so as to be operable independently of each other and being selectively actuatable alone through software or coupleable to each other in a dual operative combination.*

*14. An installation as claimed in claim 13, wherein a single said software is provided for the actuation of the entire multi-sensor scanning system.*

*15. An installation as claimed in claim 13, comprising two spindles movable in a Z-coordinate direction, one said spindle mounting said mechanical probe having said sensing stylus; and said other spindle mounting said non-contacting scanner.*

*16. An installation as claimed in claim 15, wherein said spindles are arranged on a common measuring carriage.*

*17. An installation as claimed in claim 15, wherein a measuring carriage is provided for each said spindle, said spindles being movable in synchronism and also separately of each other in selectively the same or different coordinate directions.*

*18. An installation as claimed in claim 16 or 17, wherein said non-contacting scanner is a laser scanner, said laser scanner being employable in a scanning operation and also in autofocus.*

*19. An installation as claimed in claim 18, wherein said laser scanner during scanning operation non-contactingly follows the surface contour of a workpiece being measured at a constant distance therefrom along the X and Y-coordinate directions, said laser scanning system comprising first and second interlinked closed control circuits, said first control circuit determining the transmitting power of the laser relative to the reflective characteristics of the workpiece and in dependence upon a receiving signal in a receiver controlling a transmission signal in a transmitter, and said second control circuit controlling the continual follow-up of the measuring carriage and spindle in the Z-direction into an optimum focusing plane.*

*20. An installation as claimed in claim 19, wherein said receiver includes differentiating diodes for generating a differential signal in conformance with the focusing setting of a lens, said Z-axis being automatically positioned through a liner amplifier and servomotor into the focusing plane.*

*21. An installation as claimed in claim 20, wherein said measuring carriage and spindle for the Z-axis includes a measuring system with a glass measuring rod, and the present position of elevation is conveyed to a main computer.*

*22. An installation as claimed in claim 13, wherein said non-contacting scanner is a video scanner, said video scanner receiving measuring points along the external contour of the workpiece said measuring points being determined by a digitalized picture of a respective segment of the workpiece which is generated by a video processor, the contours of said workpiece being determinable along the X and Y-coordinates through edge tracing routines in the digitalized picture, and the measuring points in the Z-direction being formed with a focusing means and the camera picture or a high-precision laser focusing system.*

*23. An installation as claimed in claim 13, wherein said mechanical probe is selectively a switching or a measuring probe.*

*24. An installation as claimed in claim 16 or 17, wherein the fundamental machine unit comprises a portal-like gantry structure having a solid base, selectively including a measuring turntable for receiving the workpiece, and a crosscarrier supporting the measuring carriage for the spindles for longitudinal displacement thereon in a direction of travel at right angles or equally directed relative to said gantry structure, said measuring carriage or carriages and the spindle or spindles being controllable from a control panel and the obtained results of measurement being recordable on a picture screen of a display unit or selectively on a printer.*

*25. Multi-coordinate measuring and testing installation, comprising a fundamental machine unit; a scanning system mounted upon said fundamental machine unit and movable in at least two coordinate directions; and a machine control unit for inputting commands for controlling operation of said scanning system, said scanning system being a multi-sensor scanning system consisting of a video scanner and a laser scanner; a microprocessor interconnected with said machine control unit for controlling said video scanner and said laser scanner so as to be operable independently of each other and being selectively actuatable alone through software of coupleable to each other in a dual operative combination; said video scanner and said laser scanner being arranged on a common beam path for detecting the same measuring point on a workpiece.*

*26. An installation as claimed in claim 25, wherein a single said software is provided for the actuation of the entire multi-sensor scanning system.*

*27. An installation as claimed in claim 25, comprising a spindle movable in a Z-coordinate direction, said spindle mounting said video scanner and said laser scanner.*

*28. An installation as claimed in claim 27, wherein said laser scanner is employable in a scanning operation and also in autofocus.*

*29. An installation as claimed in claim 28, further comprising a measuring carriage, said spindle being mounted on said measuring carriage, wherein said laser scanner during scanning operation non-contactingly follows the surface contour of a workpiece being measured at a constant distance therefrom along the X and Y-coordinate directions, said laser scanning system comprising first and second interlinked closed control circuits, said first control circuit determining the transmitting power of the laser relative to the reflective characteristics of the workpiece and in dependence upon a receiving signal in a receiver controlling a transmission signal in a transmitter, and said second control circuit controlling the continual follow-up of the measuring carriage and spindle in the Z-direction into an optimum focusing plane.*

*30. An installation as claimed in claim 29, wherein said receiver includes differentiating diodes for generating a differential signal in conformance with the focusing setting of a lens, said Z-axis being automatically positioned*

*through a liner amplifier and servomotor into the focusing plane.*

*31. An installation as claimed in claim 30, wherein said measuring carriage and spindle for the Z-axis includes a measuring system with a glass measuring rod, and the present position of elevation is conveyed to a main computer.*

*32. An installation as claimed in claim 29, wherein the fundamental machine unit comprises a portal-like gantry structure having a solid base, selectively including a measuring turntable for receiving the workpiece, and a cross-carrier supporting the measuring carriage for the spindles for longitudinal displacement thereon in a direction of travel at right angles or equally directed relative to said gantry structure, said measuring carriage or carriages, said spindle being controllable from a control panel and the obtained results of measurement being recordable on a picture screen of a display unit or selectively on a printer.*

* * * * *